United States Patent

Atkins et al.

Patent Number: 5,898,866
Date of Patent: *Apr. 27, 1999

[54] METHOD AND APPARATUS FOR COUNTING REMAINING LOOP INSTRUCTIONS AND PIPELINING THE NEXT INSTRUCTION

[75] Inventors: Mark D. Atkins, Santa Clara, Calif.; Agnes Yee Ngai; Alfred T. Rundle, both of Endwell, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/180,648

[22] Filed: Jan. 13, 1994

Related U.S. Application Data

[63] Continuation of application No. 07/287,140, Dec. 21, 1988, abandoned.

[51] Int. Cl.⁶ .............................. G06F 9/26; G06F 9/32
[52] U.S. Cl. ..................... 395/588; 395/572; 395/384
[58] Field of Search ................... 395/800, 375, 395/400, 425, 500, 250, 275, 384, 182.14, 387, 383, 572, 588; 364/DIG. 1, DIG. 2; 711/125

[56] References Cited

U.S. PATENT DOCUMENTS

| | | | |
|---|---|---|---|
| 4,097,920 | 6/1978 | Ozga | 395/588 |
| 4,179,737 | 12/1979 | Kim | 395/588 |
| 4,429,361 | 1/1984 | Maccianti et al. | 395/569 |
| 4,462,074 | 7/1984 | Linde | 395/588 |
| 4,463,422 | 7/1984 | Storer et al. | 395/588 |
| 4,566,063 | 1/1986 | Zolnowsky et al. | 395/588 |
| 4,652,997 | 3/1987 | Kloker | 395/508 |
| 4,703,481 | 10/1987 | Foremont | 371/12 |
| 4,792,892 | 12/1988 | Mary et al. | 395/375 |

FOREIGN PATENT DOCUMENTS

| | | |
|---|---|---|
| 58-117050 | 7/1983 | Japan . |
| 61-27035 | 6/1986 | Japan . |

*Primary Examiner*—Daniel H. Pan
*Attorney, Agent, or Firm*—Arthur J. Samodovitz

[57] ABSTRACT

Method and apparatus to avoid the code space and time overhead of the software-loop. Loops (repeatedly executed blocks of instructions) are often used in software and microcode. Loops may be employed for array manipulation, storage initialization, division and square-root interpretation, and microinterpretation of instructions with variable-length operands. Software creates loops by keeping an iteration count in a register or in memory. During each iteration of the code loop, software decrements the count, and then branches to the "top" of the loop is the count remains nonzero. This apparatus puts the decrement, compare, and branch-to-top into hardware, reducing the number of instructions in the loop and speeding loop execution. Hardware further speeds loop execution by eliminating the wait for the branch to the top-of-loop instruction. That is, it prefetches the top-of-loop instruction near the bottom of the loop. The loop may be initialized for a fixed iteration count, or can accept a variable count in the iteration count register. The apparatus consists of counters for the number of instructions in the loop, an iteration counter, a pointer to the top-of-loop location, and an instruction to initiate the loop.

3 Claims, 4 Drawing Sheets

METHOD AND APPARATUS FOR COUNTING REMAINING LOOP INSTRUCTIONS AND PIPELINING THE NEXT INSTRUCTION

This application is a continuation, of application Ser. No. 07/287,140, filed Dec. 21, 1988, now abandoned.

TECHNICAL FIELD

The present invention generally relates to high speed, general purpose data processing systems, and more specifically, relates to the implementation of hardware to efficiently execute loop operations.

A loop is a structure often used in software or microcode which consists of a repeatedly executed block of instructions. Loops may be employed for array manipulation, storage initialization, division and square-root interpretation, and variable length storage operations. Software ordinarily creates loops by keeping an iteration count in a register or in memory. During each iteration of the code loop, software decrements the count, and then branches to the "top" (first instruction of the loop) if the count remains non-zero.

Unfortunately, loops using branch instructions usually exhibit poor performance. Such instructions require more time to execute than most arithmetic instructions, since the branch target must be fetched from slow-storage. Conditional branches, required for a loop construct after the interaction count decrement, often cost even more cycles because the target fetch must occur before the success of the branch is known. Methods to improve branch performance usually require much hardware, such as wider instruction busses, branch-history tables, and extra instruction buffers to hold both target and segmented stream instructions.

The typical loop construct of decrement/compare/branch also requires one or more instructions to be executed in each pass through the loop solely for loop maintenance. This construct occupies code space, as well as adding time to each loop iteration.

BACKGROUND ART

An attempt to overcome these disadvantages was disclosed by Stanley Edward Ozga in U.S. Pat. No. 4,097,920 issued Jun. 27, 1978. In one of his embodiments, Ozga replaces the loop control (i.e., branch) instruction with a special bit added to each instruction of the loop. Presence of that special bit indicates that the corresponding instruction is located within the loop. Disadvantages of ozga include the need for an additional one bit field in each instruction to indicate the loop status. Also the end of the loop cannot be determined until the last loop instruction is at least partially decoded.

An improvement to Ozga is disclosed by Ysef Linde in U.S. Pat. No. 4,462,074 issued on Jul. 24, 1984. Linde discloses the use of a special register to store the address of the final loop instruction. Although this means that the final loop instruction can be identified without a special bit field or decoding of the final instruction, the operation involves a complex comparison between the final loop instruction address stored in the special register and the program counter.

U.S. Pat. No. 4,463,422, issued to James F. Storer, et al. on Jul. 31, 1984, discloses an alternative to Linde which redefines an arithmetic instruction which performs branching as well. Though Storer et al., does not explain the method of implementing the new instruction, it is conceivably analogous to the ozga reference with the attendant advantages and disadvantages.

U.S. Pat. No. 4,652,997 issued to Kloker on Mar. 24, 1987; U.S. Pat. No. 4,566,063 issued to Zolnowsky et al. on Jan. 21, 1986; U.S. Pat. No. 4,179,737 issued to Kim on Dec. 18, 1979; and U.S. Pat. No. 4,429,361 issued to Maccianti et al. on Jan. 31, 1984, all disclose additional embodiments of nested loop hardware, each of which having a combination of the disadvantages of Ozga and Linde.

DISCLOSURE OF THE INVENTION

The present invention uses specialized computer hardware and instructions designed to avoid the additional code space and execution time overhead of the software-loop, while avoiding the disadvantages found in the prior art. The preferred embodiment puts the decrement, compare, and branch-to-loop functions into hardware, reducing the number of instructions in the loop, thus speeding loop execution. Hardware further speeds loop execution by eliminating the wait for the top-of-loop instruction after the branch. Because the hardware knows the position within the loop as each instruction is executed, the top-of-loop instruction may be prefetched from any point in the loop depending upon the degree of pipelining to be desired within any specific machine architecture.

A specialized instruction (i.e., SETLOOP) is executed to initialize the loop operation. This instruction has a length field which specifies the number of instructions within the loop. This number is loaded into a counter which is decremented synchronously with the execution of each instruction of the loop, thereby maintaining an instantaneous indication of the position within the loop. When the loop is repeated, the length value is again loaded into the counter. This counter permits prefetching of branch instructions as desired.

A second field in SETLOOP instruction contains the number of times which the loop is to be executed. This number is loaded into a second counter which is decremented with each execution of the loop. The value of this second counter is used to determine which instruction to request (i.e., top-of-loop or outside-of-loop) at the end of each iteration.

A register is used to store the address of the top-of-loop instruction. This ensures that the instruction may be fetched to begin the next iteration of the loop during each previous iteration. Push-Pop stacks may be used to back up this register and each of the two counters to permit loop nesting.

DESCRIPTION OF THE INVENTION

System Architecture

The present invention is preferably embodied in a modern computer system with an IBM System 370 architecture having single or multiple processors. Such systems are herein described.

Figure 1:
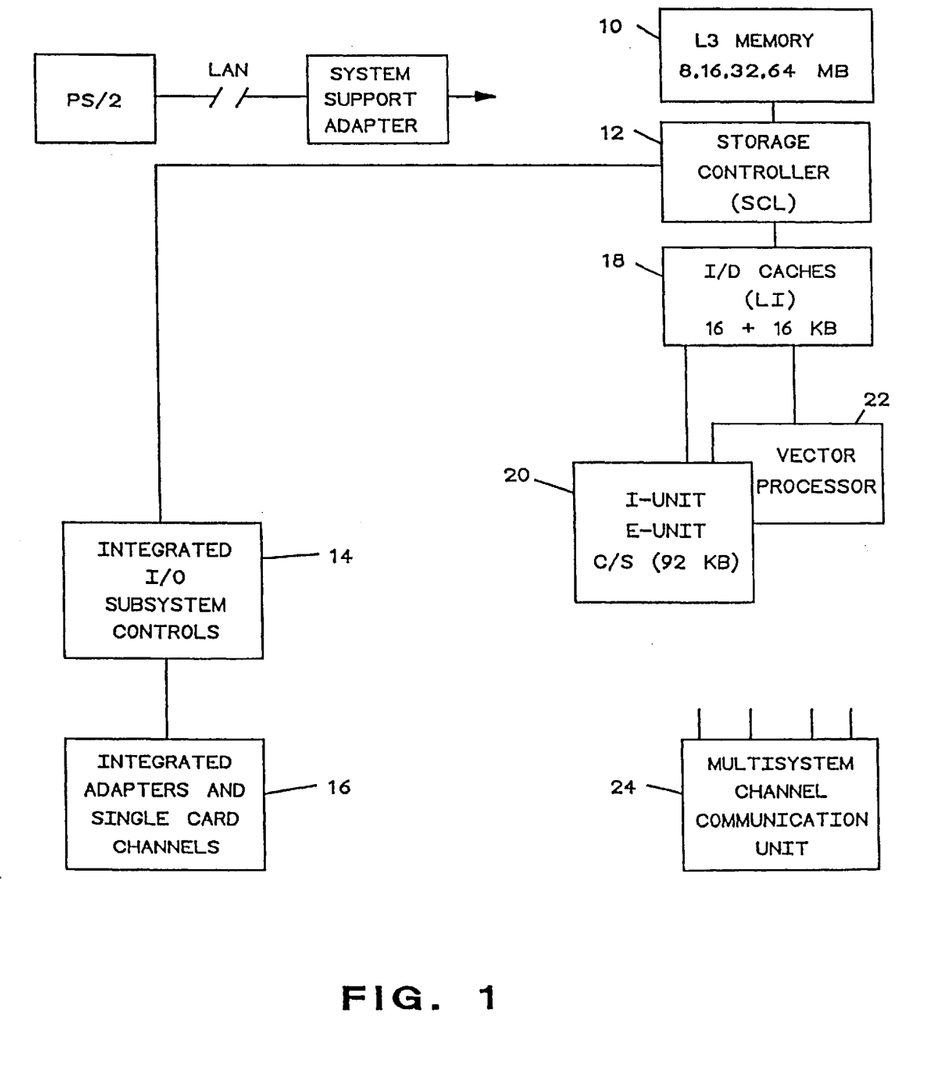
FIG. 1 is a block diagram of a single processor computer system which employs the present invention.

Referring to FIG. 1, a uniprocessor computer system employing the present invention is illustrated. In FIG. 1, the uniprocessor system comprises an L3 memory 10 connected to a storage controller (SCL) 12. On one end, the storage controller 12 is connected to integrated I/O subsystem controls 14, the controls 14 being connected to integrated adapters and single card channels 16. On the other end, the storage controller 12 is connected to I/D caches (L1) 18, which comprise an instruction cache, and a data cache, collectively termed the "L1" cache. The I/D caches 18 are connected to an Instruction unit (I-unit), an Execution unit (E-unit), a control store 20 and a vector processor (VP) 22. The vector processor 22 is described in patent application Ser. No. 06/530,842, filed Sep. 9, 1983, entitled "A Pipelined Parallel Vector Processor including Parallel Configured Element Processing Vector Elements in Parallel Fashion", now U.S. Pat. No. 4,967,343, the disclosure of which is incorporated by reference into the specification of this application. The uniprocessor system of FIG. 1 also comprises the multisystem channel communication unit 24.

The L3 memory 10 comprises 2 "intelligent" memory cards. The cards are "intelligent" due to the existence of certain specific features: error checking and correction, extended error checking and correction (ECC) refresh address registers and counters, and bit spare capability. The interface to the L3 memory 10 is 8-bytes wide. Memory sizes are 8, 16, 32 and 64 megabytes. The L3 memory is connected to a storage controller (SCL) 12.

The storage controller 12 comprises three bus arbiters arbitrating for access to the L3 memory 10, to the I/O subsystem controls 14, and to the I/D caches 18. The storage controller further includes a directory which is responsible for searching the instruction and data caches 18, otherwise termed the L1 cache, for data. If the data is located in the L1 caches 18, but the data is obsolete, the storage controller 12 invalidates the obsolete data in the L1 caches 18 thereby allowing the I/O subsystem controls 14 to update the data in the L3 memory 10. Thereafter, instruction/execution units 20 must obtain the updated data from the L3 memory 10. The storage controller 12 further includes a plurality of buffers for buffering data being input to L3 memory 10 from the I/O subsystem controls 14 and for buffering data being input to L3 memory 10 from instruction/execution units 20. The buffer associated with the instruction/execution units 20 is a 256 byte line buffer which allows the building of entries 8 bytes at a time for certain types of instructions, such as sequential operations. This line buffer, when full, will cause a block transfer of data to L3 memory to occur. Therefore, memory operations are reduced from a number of individual store operations, to a much smaller number of line transfers.

The instruction/data caches 18 are each 16K byte caches. The interface to the storage controller 12 is 8 bytes wide; thus, an inpage operation from the storage controller 12 takes 8 data transfer cycles. The data cache 18 is a "store through" cache, which means that data from the instruction/execution units 20 are stored in L3 memory and, if the corresponding obsolete data is not present in the L1 caches 18, the data is not brought into and stored in the L1 caches. To assist this operation, a "store buffer" is present with the L1 data cache 18 which is capable of buffering up to 8 store operations.

The vector processor 22 is connected to the data cache 18. It shares the dataflow of the instruction/execution unit 20 into the storage controller 12, but the vector processor 22 will not, while it is operating, permit the instruction/execution unit 20 to make accesses into the storage controller 12 for the fetching of data.

The integrated I/O subsystem 14 is connected to the storage controller 12 via an 8-byte bus. The subsystem 14 comprises three 64-byte buffers used to synchronize data coming from the integrated I/O subsystem 14 with the storage controller 12. That is, the instruction/execution unit 20 and the I/O subsystem 14 operate on different clocks, the synchronization of the two clocks being achieved by the three 64-byte buffer structure.

The multisystem channel communication unit 24 is a 4-port channel-to-channel adapter, packaged externally to the system.

Figure 2:
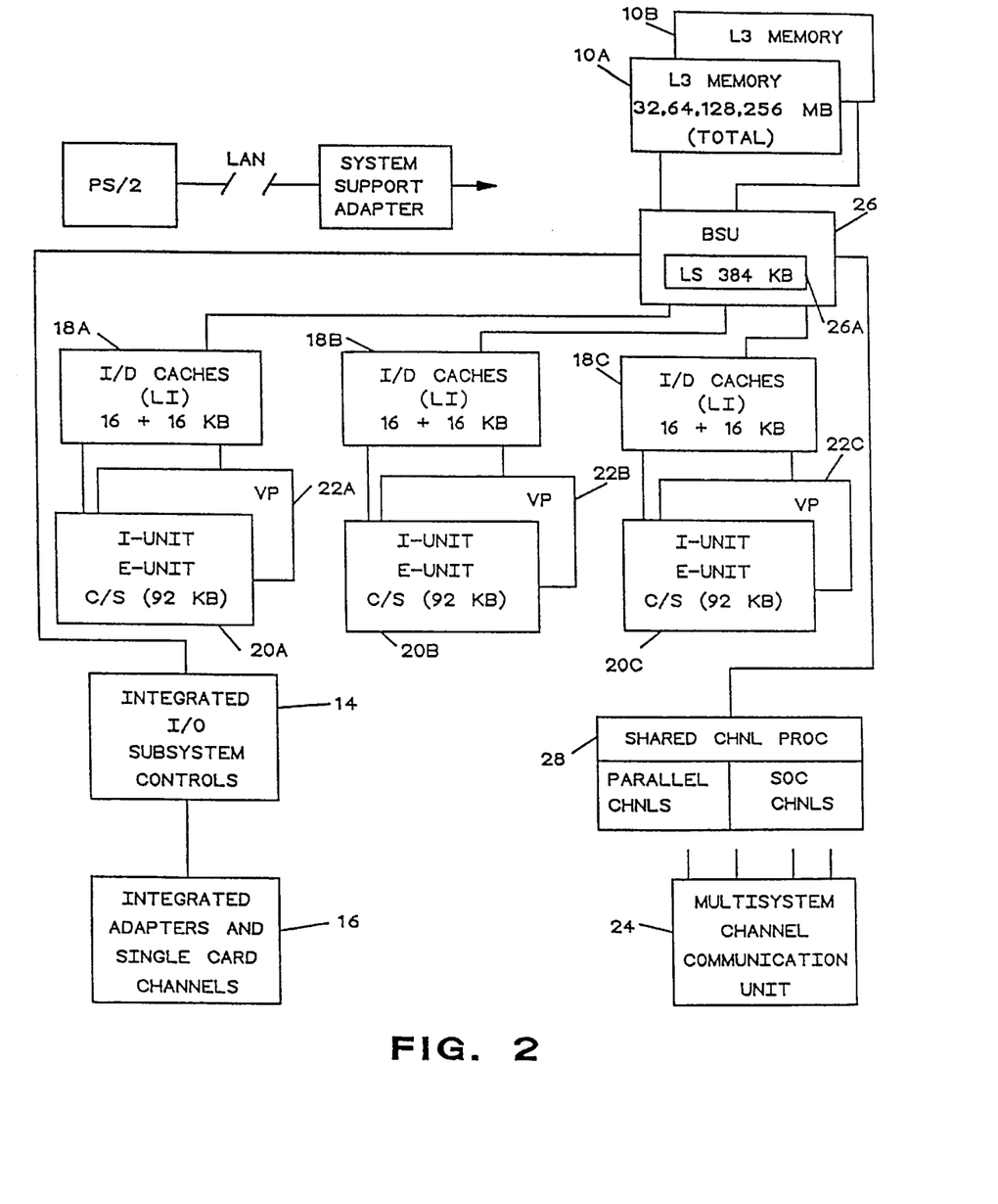
FIG. 2 is a block diagram of a multiple processor computer system which employs the present invention.

Referring to FIG. 2, a triadic (multiprocessor) system employing the present invention is illustrated. In FIG. 2, a pair of L3 memories 10a/10b are connected to a bus switching unit (BSU) 26, the BSU including an L2 cache 26a. The BSU26 is connected to the integrated I/O subsystem 14, to shared channel processor 28, and to three processors: a first processor including instruction/data caches 18a and instruction/execution unit/control store 20a, a second processor including instruction/data caches 18b and instruction/execution units/control store 20b, and a third processor including instruction/data caches 18c and instruction/execution units/control store 20c. Each of the instruction/data caches 18a, 18b, and 18c are termed "L1" caches. The cache in the BSU 26 is termed the L2 cache 26a, and the main memory 10a/10b is termed the L3 memory.

The BSU 26 connects the three processors 18a/20a, 18b/20b, and 18c/20c, two L3 memory ports 10a/10b, two shared channel processors 28, and an integrated I/O subsystem 14. The BSU 26 comprises circuits which decide the priority for requests to be handled, such as requests from each of the three processors to L3 memory, or requests from the I/O subsystem 14 or shared channel processors, circuits which operate the interfaces, and circuits to access the L2 cache 26a. The L2 cache 26a is a "store in" cache, meaning that operations which access the L2 cache, to modify data, must also modify data resident in the L2 cache (the only exception to this rule is that, if the operation originates from the I/O subsystem 14, and if the data is resident only in L3 memory 10a/10b and not in L2 cache 26a, the data is modified only in L3 memory, not in L2 cache). The system also containing vector processors 22a, 22b, and 22c associated with instruction/execution units 20a, 20b and 20c, respectively.

The interface between the BSU 26 and L3 memories 10a/10b comprises two 16-byte lines/ports in lieu of the single 8-byte port in FIG. 1. However, the memory 10 of FIG. 1 is identical to the memory cards 10a/10b of FIG. 2. The two memory cards 10a/10b of FIG. 2 are accesses in parallel.

The shared channel processor 28 is connected to the BSU 26 via two ports, each port being an 8-byte interface. The shared channel processor 28 is operated at a frequency which is independent of the BSU 26, the clocks within the BSU being synchronized with the clocks in the shared channel processor 28 in a manner which is similar to the clock synchronization between the storage controller 12 and the integrated I/O subsystem 14 of FIG. 1.

A functional description of the operation of the uniprocessor computer system of FIG. 1 will be set forth in the following paragraphs with reference to FIG. 1. Normally, instructions are resident in the instruction cache (L1 cache) 18, waiting to be executed. The instruction/execution unit 20 searches a directory disposed within the L1 cache 18 to determine if the typical instruction is stored therein. If the instruction is not stored in the L1 cache 18, the instruction/execution unit 20 will generate a storage request to the storage controller 12. The address of the instruction, or the cache line containing the instruction will be provided to the storage controller 12. The storage controller 12 will arbitrate for access to the bus connected to the L3 memory 10. Eventually, the request from the instruction/execution unit 20 will be passed to the L3 memory 10, the request comprising a command indicating a line in L3 memory is to be fetched for transfer to the instruction/execution unit 20. The L3 memory will latch the request, decode it, select the location in the memory card wherein the instruction is stored, and, after a few cycles of delay, the instruction will be delivered to the storage controller 12 from the L3 memory in 8-byte increments. The instruction is then transmitted from the storage controller 12 to the instruction cache (L1 cache) 18, wherein it is temporarily stored. The instruction is retransmitted from the instruction cache 18 to the instruction buffer within the instruction/execution unit 20. The instruction is decoded via a decoder within the instruction unit 20. Quite often, an operand is needed in order to execute the instruction, the operand being resident in memory 10. The instruction/execution unit 20 searches the directory in the data cache 18; if the operand is not found in the directory of the data cache 18, another storage access is issued by the instruction/execution unit 20 to access the L3 memory 10, exactly in the manner described above with respect to the instruction cache miss. The operand is stored in the data cache, the instruction/execution unit 20 searching the data cache 18 for the operand. If the instruction requires the use of microcode, the instruction/execution unit 20 makes use of the microcode resident on the instruction execution unit 20 card. If an input/output (I/O) operation need be performed, the instruction/execution unit 20 decodes an I/O instruction, resident in the instruction cache 18. Information is stored in an auxiliary portion of L3 memory 10, which is sectioned off from instruction/ execution. At that point, the instruction/execution unit 20 informs the integrated I/O subsystem 14 that such information is stored in L3 memory, the subsystem 14 processor accessing the L3 memory 10 to fetch the information.

A functional description of the operation of the multiprocessor computer system of FIG. 2 will be set forth in the following paragraphs with reference to FIG. 2. In FIG. 2, assume that a particular instruction/execution unit, one of 20a, 20b or 20c, requires an instruction and searches its own L1 cache, one of 18a, 18b or 18c, for the desired instruction. Assume further that the desired instruction is not resident in the L1 cache. The particular instruction execution unit will then request access to the BSU 26 in order to search the L2 cache disposed therein. The BSU 26 contains an arbiter which receives requests from each of the instruction/ execution units 20a, 20b, 20c and from the shared channel processor 28 and from the integrated I/O subsystem 14, the arbiter granting access to one of these units at a time. When the particular instruction/execution unit (one of 20a–20c) is granted access to the BSU to search the L2 cache 26a, the particular instruction/execution unit searches the directory of the L2 cache 26a disposed within the BSU 26 for the desired instruction. Assume that the desired instruction is found in the L2 cache. In that case, the desired instruction is returned to the particular instruction/execution unit. If the desired instruction is not located within the L2 cache, as indicated by its directory, a request is made to the L3 memory, one of 10a or 10b, for the desired instruction. If the desired instruction is located in the L3 memory, it is immediately transmitted to the BSU 26, 16 bytes at a time, and is bypassed to the particular instruction/execution unit (one of 20a–20c) while simultaneously being stored in the L2 cache 26a in the BSU 26. Additional functions resident within the BSU relate to rules for storage consistency in a multiprocessor system. For example, when a particular instruction/ execution unit 20c (otherwise termed "processor" 20c) modifies data, that data must be made visible to all other instruction/execution units, or "Processors", 20a, 20b in the complex. If processor 20c modifies data presently stored in its L1 cache 18c, a search for that particular data is made in the L2 cache directory 26a of the BSU 26. If found, the particular data is modified to reflect the modification in the L1 cache 18c. Furthermore, the other processors 20a and 20b are permitted to see the modified, correct data now resident in the L2 cache 26a in order to permit such other processors to modify their corresponding data resident in their L1 caches 18a and 18b. The subject processor 20c cannot reaccess the particular data until the other processors 20a and 20b have had a chance to modify their corresponding data accordingly.

Figure 3:
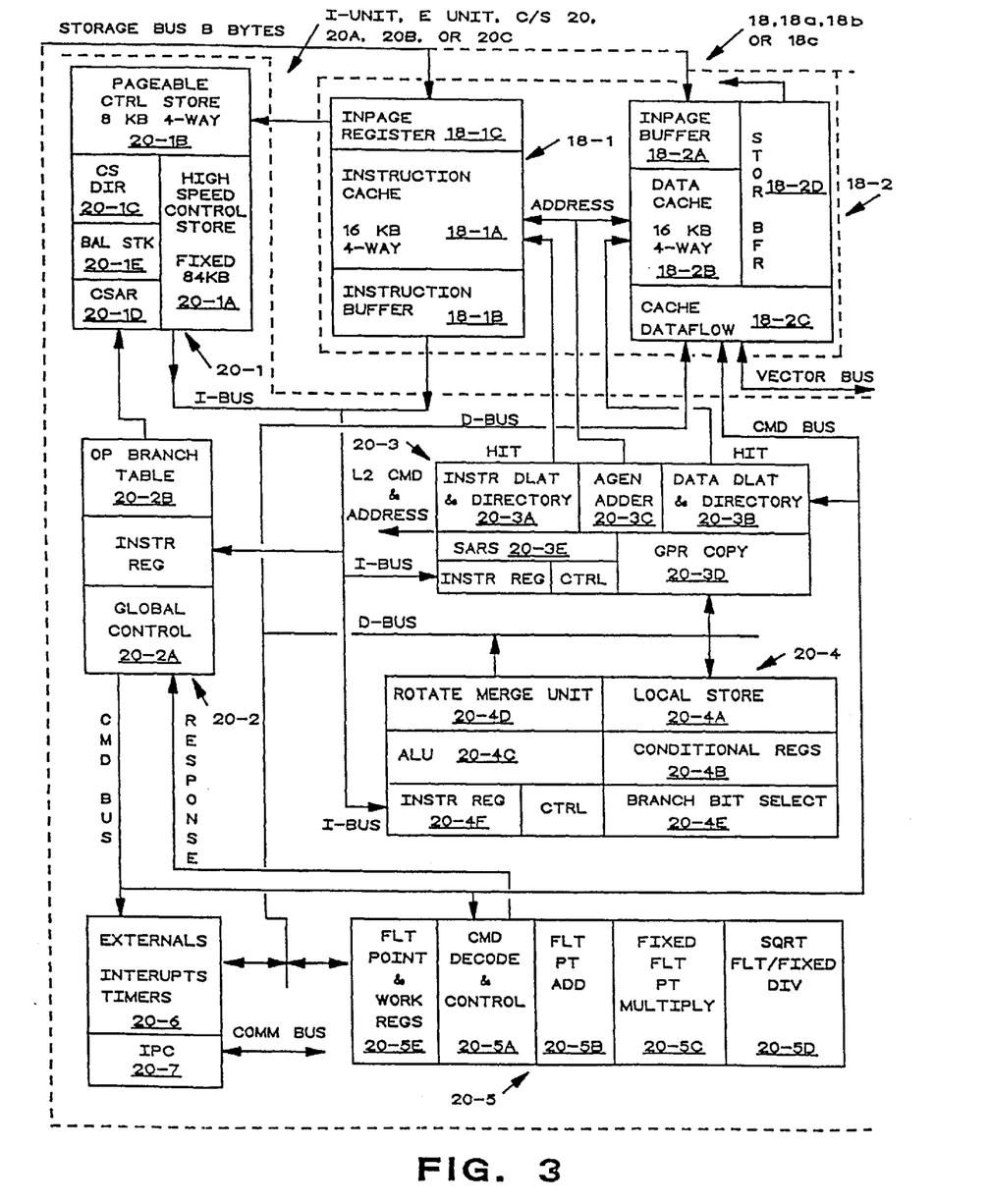
FIG. 3 is a detailed block diagram of the instruction/execution unit.

Referring to FIG. 3, a detailed construction of each instruction/execution unit (20 in FIG. 1 or one of 20a–20c in FIG. 2) and its corresponding L1 cache (18 in FIG. 1 or one of 18a–18c in FIG. 2) is illustrated. In FIG. 1, and in FIG. 2, the instruction/execution units 20, 20a, 20b and 20c are disposed in a block labelled "I-unit E-unit C/S (92 KB)". This block may be termed the "processor", the "instruction processing unit", or, as indicated above, the "instruction/ execution unit". For the sake of simplicity in the description provided below, each of the blocks 20, 20a–20c will be called the "processor". In addition, the "I/D caches (L1)" will be called the "L1 cache". FIG. 3 provides a detailed construction for the processor (20, 20a, 20b or 20c) and for the L1 cache (18, 18a, 18b or 18c).

In FIG. 3, the processor (one of 20, 20a–20c) comprises the following elements. The control store subsystem 20-1 comprises a high speed fixed control store 20-1a of 84 k bytes, a pagable area (8 k byte, 2 k word, 4-way associative pagable area) 20-1b, a director 20-1c for the pagable control store 20-1b, a control store address register (CSAR) 20-1d, and an 8-element branch and link (BAL STK) facility 20-1e. Machine state controls 20-2 include the global controls 20-2a for the processor, an op branch table 20-2b connected to the CSAR via the control store origin address bus which is used to generate the initial address for microcoded instructions. An address generation unit 20-3 comprises 3 chips, a first being an instruction cache DLAT and directory 20-3a, a second being a data cache DLAT and directory 20-3b, an a third being an address generation chip 20-3c connected to the L1 cache 18, 18a–18c via the address bus. The instruction DLAT and directory 20-3a is connected to the instruction cache portion of the L1 cache via four "hit" lines which indicate that the requested instruction will be found in the instruction cache portion 18-1a of the L1 cache. Likewise, four "hit" lines connect the data DLAT and directory 20-3b indicating that the requested data will be found in the data cache 18-2b portion of the L1 cache. The address generation unit 20-3 contains copies of the 16 general purpose registers used to generate addresses (within GPR COPY 20-3d) and includes three storage address registers (SARS) 20-3e, used to provide addresses to the microcode for instruction/ execution. A fixed point instruction/execution unit 20-4 is connected to the data cache 18-2 via the data bus (D-bus) and contains a local store stack (local store) 20-4a which contains the 16 general purpose registers mentioned above and a number of working registers used exclusively by the microcode; condition registers 20-4b contain the results of a number of arithmetic and shift type operations and contain the results of a 370 condition code; a four-byte arithmetic logic unit (ALU) 20-4c; an 8-byte rotate merge unit 20-4d; and a branch bit select hardware 20-4e which allows the selection of bits from various registers which determine the direction of a branch operation, the bits being selected from general purpose registers, working registers, and the condition registers. A floating point processor 20-5 includes floating point registers and four microcode working registers 20-5e, a command decode and control function 20-5a, a floating point adder 20-5b, a fixed point and floating point multiply array 20-5c, and a square-root and divide facility 20-5d. The floating point processor 20-5 is disclosed in U.S. patent application Ser. No. 102,985, entitled "Dynamic Multiple Instruction Stream Multiple Data Multiple Pipeline Apparatus for Floating Point Single Instruction Stream Single Data Architecture", filed on Sep. 30, 1987, the disclosure of which is incorporated by reference into the specification of this application. The ALU 20-4c contains an adder, the adder being disclosed in pending patent application Ser. No. 066,580, filed Jun. 26, 1987, entitled "A High Performance Parallel Binary Byte Adder", the disclosure of which is incorporated by reference into the specification of this application. An externals chip 20-6 includes timers and interrupt structure, the interrupts being provided from the I/O subsystem 14, and others. An interprocessor communication facility (IPC) 20-7 is connected to the storage subsystem via a communication bus, thereby allowing the processors to pass messages to each other and providing access to the time of day clock.

In FIG. 3, the L1 cache (one of 18, 18a, 18b or 18c) comprises the following elements. An instruction cache 18-1, which comprises a 16k byte/4-way cache 18-1a, a 15-byte instruction buffer 18-1b at the output thereof, and an 8-byte inpage resister 18-1c at the input from storage. The storage bus, connected to the instruction cache 18-1 is eight bytes wide, being connected to the inpage register 18-1c. The inpage register 18-1c is connected to the control store subsystem 20-1 and provides data to the subsystem in the event of a pagable control store miss and new data must be brought into the control store. A data cache 18-2 comprises an inpage buffer 18-2a also connected to the storage bus; a data cache 18-2b which is a 16 k byte/4-way cache; a cache dataflow 18-2c which comprises a series of input and output registers and connected to the processor via an 8-byte data bus (D-bus) and to the vector processor (22a–22c) via an 8-byte "vector bus"; and an 8-element store buffer (STORE BFR) 18-2d.

A description of the functional operation of a processor and L1 cache shown in FIG. 3 will be provided in the following paragraphs with reference to FIG. 3 of the drawings. Assume that an instruction to be executed is located in the instruction cache 18-1a. The instruction is fetched from the instruction cache 18-1a and is stored in the instruction buffer 18-1b (every attempt is made to keep the instruction buffer full at all times). The instruction is fetched from the instruction buffer 18-1b and is stored in the instruction registers of the address generation chip 20-3, the fixed point execution unit 20-4, and the machine state controls 20-2, at which point, the instruction decoding begins. Operands are fetched from the GPR COPY 20-3d in the address generation unit 20-3 if an operand is required (normally, GPR COPY is accessed if operands are required for the base and index registers for an RX instruction). In the next cycle, the address generation process begins. The base and index register contents are added to a displacement field from the instruction, and the effective address is generated and sent to the data cache 18-2 and/or the instruction cache 18-1. In this example, an operand is sought. Therefore, the effective address will be sent to the data cache 18-2. The address is also sent to the data DLAT and directory chip 20-3b (since, in this example, an operand is sought). Access to the cache and the directories will begin in the third cycle. The DLAT 20-3b will determine if the address is translatable from an effective address to an absolute address. Assuming that this translation has been previously performed, we will have recorded the translation. The translated address is compared with the output of the cache directory 20-3b. Assuming that the data has previously been fetched into the data cache 18-2b, the directory output and the DLAT output are compared; if they compare equal, one of the four "hit" lines are generated from the data DLAT and directory 20-3b. The hit lines are connected to the data cache 18-2b; a generated instruction as an address, the op-branch table providing the beginning address of the microcode routine needed to execute the instruction. These instructions, as well as others, require more than 1 cycle to execute. Therefore, instruction decoding is suspended while the op-branch table is being searched. In the case of microcode, the I-BUS is utilized to provide microinstructions to the decoding hardware. The instruction cache 18-1a is shut-off, the control store 20-1a is turned-on, and the microinstructions are passed over the I-BUS. For floating point instructions, decoding proceeds as previously described, except that, during the address generation cycle, a command is sent to the floating point unit 20-5 to indicate and identify the proper operation to perform. In an RX floating point instruction, for example, an operand is fetched from the data cache 18-2b, as described above, and the operand is transmitted to the floating point processor 20-5 in lieu of the fixed point processor 20-4. Execution of the floating point instruction is commenced. When complete, the results of the execution are returned to the fixed point execution unit 20-4, the "results" being condition code, and any interrupt conditions, such as overflow.

In the following paragraph, a description of the functional operation of FIG. 3 will be again set forth, this description emphasizing the pipelined nature of such functional operation of FIG. 3.

The first stage of the pipeline is termed instruction decode. The instruction is decoded. In the case of an RX instruction, where one operand is in memory, the base and index register contents must be obtained from the GPR COPY 20-3d. A displacement field is added to the base and index registers. At the beginning of the next cycle, the addition of the base, index, and displacement fields is completed, to yield an effective address. The effective address is sent to the DLAT and Directory chips 20-3a/20-3b. The high order portion of the effective address must be translated, but the low order portion is not translated and is sent to the cache 18-1a/18-2b. In the third cycle, the cache begins an access operation, using the bits it has obtained. The DLAT directories are searched, using a virtual address to obtain an absolute address. This absolute address is compared with the absolute address kept in the cache directory. If this compare is successful, the "hit" line is generated and sent to the cache chip 18-1a/18-2b. Meanwhile, the cache chip has accessed all four associativity classes and latches on output accordingly. In the fourth cycle, one of the four "slots" or associativity classes are chosen, the data is aligned, and is sent across the data bus to the fixed or floating point processor 20-4, 20-5. Therefore, at the end of the fourth cycle, one operand is latched in the ALU 20-4c input. Meanwhile, in the processor, other instructions are being executed. The GPR COPY 20-3d and the local store 20-4a are accessed to obtain the other operand. At this point, both operands are latched at the input of the ALU 20-4c. One cycle is taken to do the computation, set the condition registers, and finally write the result in the general purpose registers in the CPR COPY 20-3d. The result may be needed, for example, for address computation purposes. Thus, the result would be input to the AGEN ADDER 20-3c. During the execution of certain instruction, no access to the caches 18-1a/18-2b is needed. Therefore, when instruction decode is complete, the results are passed directly to the execution unit without further delay (in terms of access to the caches). Therefore, as soon as an instruction is decoded and passed to the address generation chip 20-3, another instruction is decoded.

SETLOOP Hardware

Having thus illustrated the overall preferred hardware system, the hardware dedicated to the SETLOOP instruction is described. The normal execution of a prior art software loop can be seen in the sample listing of Table 1. The sample code is shown in IBM 370 Assembler Language. The first two instructions load the initial condition. The next two instructions are the operations to be repeated. The last instruction is executed with each iteration of the loop. The result is that two instructions are required to initialize the loop and three instructions are executed within the loop.

TABLE 1

| POWERS21 | : Code to Raise 2 numbers (NUM1, NUM2) to the (N)th power |
|---|---|
| inputs | : RegN contains the Power (N), N 0 |
|  | : RegNum1 contains the 1st Number |
|  | : RegNum2 contains the 2nd Number |
| outputs | : Result1 (Reg) contains 1st number to Nth power |
|  | : Result2 (Reg) contains 2nd number to Nth power |
| POWERS21 | : LA Result1,1    ;initialize |
|  | LA Result2,1 |
| TOP: | MR Result1,Regnum1 ;next higher power Result MR Result2,RegNum2 |
|  | BCT RegN, TOP ;decrement count, branch to top if non-zero |

*Note that 3 instructions are executed N-times for the Branch-based Loop

Table 2 shows a listing for performing the same loop using the SETLOOP instruction. Initialization requires the same first two instructions, but requires a third instruction (i.e., the new SETLOOP instruction) as well. However, the loop now requires only two instructions for execution, a saving in this example of at least one-half for each iteration of the loop. Actually the savings are greater for the preferred pipelined architecture as explained further below.

TABLE 2

| POWERS22 | : Code to Raise 2 numbers (NUM1, NUM2) to the (N)th power |
|---|---|
| inputs | : RegN contains the Power (N), N 0 |
|  | : RegNum1 contains the 1st Number |
|  | : RegNum2 contains the 2nd Number |
| outputs | : Result1 (Reg) contains 1st number to Nth power |
|  | : Result2 (Reg) contains 2nd number to Nth power |
| POWERS22 | : LA Result1,1    ;initialize |
|  | LA Result2,1 |
|  | SETLOOP RegN,DEC,BOT ;decrement RegN as COUNT_IT |
|  | MR Result1,Regnum1 ;next higher power Result |
| BOT: | MR Result2,Regnum2 ; |

*Note that 2 instructions are executed N-times for the SETLOOP Loop.

The SETLOOP instruction initializes the loop control hardware REG N serves as the counter to count the number of iterations to execute the loop. It is decremented with each iteration to control the branch at the bottom of the loop. BOT is the number of instructions within the loop (i.e., two). This number is entered into the field by the compiler or other system software. It is loaded into a special register which is decremented as each loop instruction is executed. The register is reloaded with BOT after each branch to the beginning of the loop for a new iteration. In this manner, the instantaneous position within the loop is always known.

Thus, from a purely software point of view, the use of the new SETLOOP instruction provides a saving by eliminating a branch instruction within the loop through the use of an initializing instruction (i.e., SETLOOP) executed before the loop is entered. Even greater benefits are seen as the hardware is examined.

Figure 4:
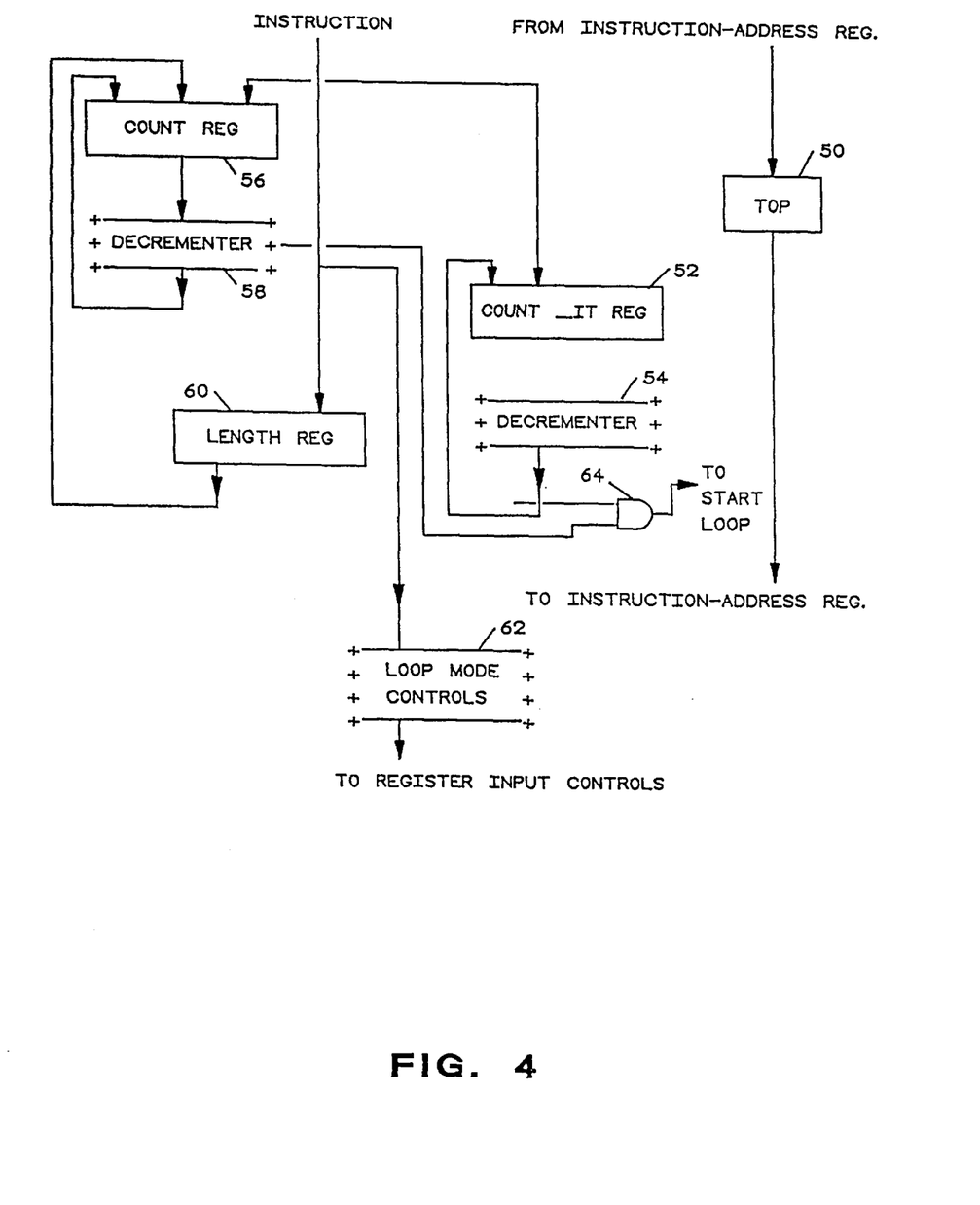
FIG. 4 is a block diagram of the specific hardware directed to the present invention.

The hardware associated with the SETLOOP instruction is shown schematically in FIG. 4. Whenever the SETLOOP instruction is decoded, the contents of the instruction address register (after being incremented to the next address following the SETLOOP instruction) is loaded into register TOP 50. Storing of this address permits easy return to the top-of-loop instruction whenever the branch conditions require another iteration. As shown, gate 64 enables the contents of TOP 50 back into the instruction address register.

Decoding of the SETLOOP instruction also causes the contents of the field specifying the number of instructions in the loop (see software description of variable BOT, above) to be loaded into COUNT reg 56 and LENGTH reg 60. COUNT reg 56 is decremented by decrementer 58 with each execution of a loop instruction. Decrementing of COUNT reg 56 to zero, one, or a higher number depending upon the degree of pipelining desired, signifies that a branch decision is in order. If another iteration is necessary, COUNT reg 56 is reloaded with the contents of LENGTH reg 60 and the instruction address reg is reloaded with the contents of TOP 50.

Decoding of the SETLOOP instruction also causes loading of COUNT-IT reg 52 with the number of iterations of the loop to be executed (see above software description of field variable REGN). With each decrementation of COUNT reg 56 by decrementer 58 to its minimum value, COUNT-IT reg 52 is decremented by decrementer 54. Decrementation of COUNT-IT reg 52 to zero signifies no further iterations of the loop and causes execution of the instruction following the loop.

Loop mode controls 62 are initialized by the SETLOOP instruction also. It can be readily seen that COUNT-IT reg 52 and COUNT reg 56 together can predict the direction of the branch as many instructions in advance as is desirable in a highly pipelined architecture such as in the preferred embodiment herein. It is further apparent that TOP 50, COUNT-IT reg 52, COUNT reg 56, and LENGTH reg 60 can each easily be replaced with Push-Pop stacks as is well-known in the prior art to permit efficient nesting of do loops.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

We claim:

1. A computer system for executing a program loop a plurality of iterations, said program loop comprising one or more program instructions, said system comprising:

a first register for storing an address of one of said program instructions at a beginning of said loop;

a second register for storing an integer representing a number of iterations that said program loop has yet to be executed;

a third register for storing an integer representing a number of program instructions yet to be executed in a current iteration of said program loop; and computer hardware means, responsive to each program instruction within said program loop, for executing said each program instruction and decrementing said third register, responsive to completion of each iteration of said program loop, for decrementing said second register, and if said second register indicates that at least one more iteration is required, for continuing program execution with the program instruction whose address is stored in said first register, whereby no branch program instruction is required in said program loop, and if said second register indicates that all program iterations have been completed, for continuing program execution after said program loop, and responsive to a value in said second register indicating a last iteration of said program loop and a value in said third register indicating that a predetermined integer greater than zero of program instructions remain to be executed in a last iteration of said program loop, for prefetching a next instruction to follow completion of a last program instruction in the last iteration of said program loop.

2. A computer system for executing a program loop a plurality of iterations and executing an initialization program instruction which immediately precedes said program loop, said program loop comprising one or more program instructions, said system comprising: first, second and third registers; and computer hardware means, responsive to said initialization program instruction, for (a) loading said first register with an address of one of said program instructions at a beginning of said loop; (b) loading said second register with an integer representing a total number of iterations that said program loop will be executed, (c) loading said third register with an integer representing a total number of program instructions within said program loop and (d) recognizing a next program instruction as a first program instruction in said program loop, responsive to each program instruction within said program loop, for executing said each program instruction and decrementing said third register, and responsive to completion of each iteration of said program loop, for decrementing said second register, and if said second register indicates that at least one more iteration is required, for continuing program execution with the program instruction whose address is stored in said first register, whereby no branch program instruction is required in said program loop, and if said second register indicates that all program iterations have been completed, for continuing program execution after said program loop.

3. A computer system for executing a program loop a plurality of iterations, said program loop comprising one or more program instructions, said system comprising:

a first register for storing an address of one of said program instructions at a beginning of said loop;

a second register for storing an integer representing a number of iterations that said program loop has yet to be executed;

a third register for storing an integer representing a number of program instructions yet to be executed in a current iteration of said program loop; and computer hardware means, responsive to each program instruction within said program loop, for executing said each program instruction and decrementing said third register, responsive to completion of each iteration of said program loop, for decrementing said second register, and if said second register indicates that at least one more iteration is required, for continuing program execution with the program instruction whose address is stored in said first register, whereby no branch program instruction is required in said program loop, and if said second register indicates that all program iterations have been completed, for continuing program execution after said program loop, and responsive to a value in said second register indicating a last iteration of said program loop and a value in said third register indicating that a predetermined integer greater than zero of program instructions remain to be executed in said last iteration of said program loop, for determining, before execution of a last program instruction in the last iteration, an address for an instruction to be executed immediately following said last program instruction in said last iteration.

* * * * *